United States Patent
Darwin

(10) Patent No.: US 10,627,223 B1
(45) Date of Patent: Apr. 21, 2020

(54) HETERODYNING OPTICAL PHASE MEASURING DEVICE FOR SPECULAR SURFACES

(71) Applicant: Michael John Darwin, Portland, OR (US)

(72) Inventor: Michael John Darwin, Portland, OR (US)

(73) Assignee: ALLAGI INCORPORATED, Portland, OR (US)

( * ) Notice: Subject to any disclaimer, the term of this patent is extended or adjusted under 35 U.S.C. 154(b) by 0 days.

(21) Appl. No.: 16/451,567

(22) Filed: Jun. 25, 2019

(51) Int. Cl.
   *H04N 7/18* (2006.01)
   *G01B 11/25* (2006.01)
   *H04N 5/225* (2006.01)

(52) U.S. Cl.
   CPC ....... *G01B 11/2513* (2013.01); *H04N 5/2256* (2013.01)

(58) Field of Classification Search
   CPC .................... G01B 11/2513; H04N 5/2256
   USPC ................ 348/136, 135, 137, 140, 143, 142
   See application file for complete search history.

(56) References Cited

U.S. PATENT DOCUMENTS

| 2008/0117438 | A1 | 5/2008 | Quirion et al. |
| 2015/0054918 | A1* | 2/2015 | Lee ..................... G01B 11/2522 348/46 |
| 2017/0019659 | A1 | 1/2017 | Xiang et al. |
| 2018/0080766 | A1* | 3/2018 | Johnson ................... G02B 9/34 |

* cited by examiner

*Primary Examiner* — Robert Chevalier
(74) *Attorney, Agent, or Firm* — Miller Nash Graham & Dunn LLP

(57) ABSTRACT

A system can include an axis, a motor coupled with the axis and configured to rotate the axis, an optical modulator coupled with the axis and configured to be rotated by the axis, a lens element, a projection surface, a light source configured to shine light through the optical modulator to project structured light onto the projection surface through the lens element, and a sensor configured to capture an image of a sample and structured light that is reflected from the projection surface and the sample surface. The system can also include a computing system having a synchronization module configured to phase lock the system by coordinating the light source and the sensor and an analysis module configured to compute a three-dimensional (3D) object based on the structured light that is reflected from the projection surface and the sample surface.

20 Claims, 7 Drawing Sheets

HETERODYNING OPTICAL PHASE MEASURING DEVICE FOR SPECULAR SURFACES

TECHNICAL FIELD

Embodiments of the disclosed technology are generally directed to methods, techniques, systems, and apparatuses for measuring specular surfaces such as glass, plastic, and metal.

BACKGROUND

Certain conventional systems have used interferometry, laser scattering methods, or structured light for three-dimensional (3D) scanning to extract geometrical measurements, e.g., of a particular sample. Some structured light measuring systems use a quasi-static projection of light and analyze the subsequent captured images. A few of these approaches will analyze the bend or distortion in the line as a direct measure of displacement, as well as the width of the projected lines as a measure of surface curvature.

In some cases, historical approaches will use a Fourier transform of the captured image to extract the spatial frequencies of the measured surface to enable surface reconstruction. In most all cases, the historical systems use multiple line widths and pitches in the structured light to remove phase errors. However, many of these approaches could be considered static or unmodulated approaches and thus subject to higher background noise. Some of these approaches use shifting/moving light structure to enhance the signal but this is typically limited to a linear shift in one dimension.

Further, measurements of specular surfaces is a common industrial practice in the manufacturing of glass (e.g., such as that used for displays), optics, automobiles, machined metallic parts, etc. Conventional techniques are typically optical in nature due to the speed of measurement over contact techniques. However, several challenges exist to be able to measure specular parts using non-contact optical techniques. Specifically, due to their specular surfaces, optical measurements often will reflect the inhomogeneity of the light source being used; this may produce "hot spots" at specific angles of observation which undesirably result in saturation of the detector/sensor, usually resulting in either data that is not processable or erroneous results. Further, some specular material is also transparent, such as glass and or conventional optics, which results in very low signals reflected from the sample surface. Interferometers are often used to address the low signal levels and custom part handling and illumination optics are employed to reduce the issues arising from inhomogeneity of the illumination. Consequently, this generally increases unwanted cost and time, while making the system design more complicated Embodiments according to the disclosed technology address these and other limitations.

DETAILED DESCRIPTION

Figure 1:
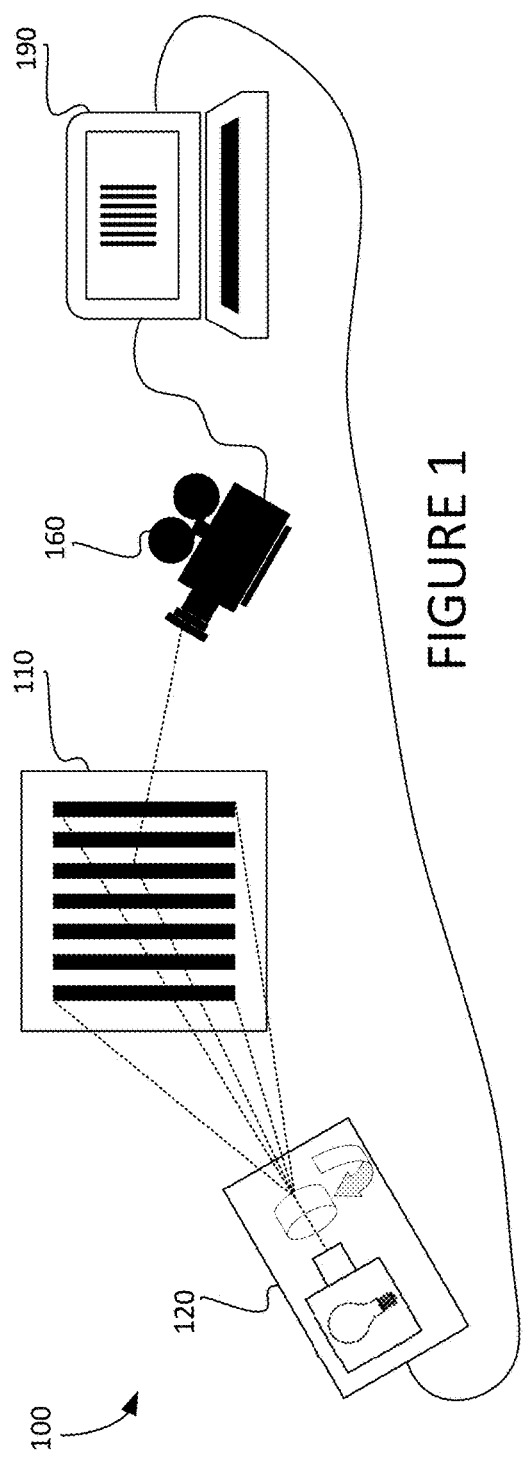
FIG. 1 illustrates a first example of a measuring system in accordance with certain implementations of the disclosed technology.

Implementations of the disclosed technology generally pertain to methods and apparatuses used for measuring the geometry of manufactured products. Various industries typically rely on geometrical measurements to ensure quality control and sound manufacturing practices of a product and, in some cases, these geometrical measurements are integrated into the process flow to ensure that unit level specifications are met for pre-assemblies or integration, for example.

Certain implementations may include the combining of heterodyning phase measurements with one or more diffuse scattering screens to produce a diffuse light source. Alternatively or in addition thereto, implementations may include spatially modulating the diffuse light source while tracking the absolute phase of the modulation. Alternatively or in addition thereto, implementations may include observing the spatially modulated diffuse reflected light from a specular object and reconstructing the optical phase projected across the surface of the object.

Among the many advantages provided by the disclosed technology are the ability to measure large area surfaces without mechanically moving the object, the ability to measure very thin glass without concern of internal reflections, the ability to measure highly curved surfaces, and a low-cost solution for mass production, for example.

Semiconductor manufacturers may deposit/grow copper pillars or bumps on an integrated circuit as one of the last processing steps in the factory. Control of the Bump Height and Bump Diameter are generally considered critical process parameters to control due to the impact on yield and electrical properties if they are not processed correctly. As such, fully automated systems are needed to inspect and measure each silicon wafer and integrated circuit, as well as each bump on the integrated circuit. Statistical sampling may be used to monitor this process step and is typically considered a critical monitor for product reliability and yield.

Another rapidly growing market is the three-dimensional (3D) printer, or additive manufacturing market, in which 3D objects are either designed from scratch or imaged in 3D and then reproduced. In the case of design from scratch, quality control of the 3D printed object can be monitored using geometric measurement tools to ensure the appropriate manufacturing tolerance has been achieved. In the case of replication, a sufficiently accurate shell, or equivalent surface, can be measured and subsequently used to emulate the desired object, with the end user defining the internal matrix under constraints of weight, strength, and/or function. These 3D print objects may be supplied to several industries including, but not limited to, aerospace, biomedical, or jewelry.

The disclosed technology generally provides methods and apparatuses for generating and projecting structured light on a sample and subsequently measuring and analyzing the projected light to produce data in three dimensions. The structured light will typically consist of one or more lines of variable (i.e., controlled) width, pitch, and wavelength, which will cover a predefined area and be referred to herein as the Light Frame of Reference (LFOR). Within the LFOR there will be defined a central axis, about which the LFOR may be rotated. One or more sensors, which may include, but not be limited to, a CCD array or camera, may measure the projected structured light on the sample at one or more locations and be referred to herein as the image capture data array (ICDA). Images/data may be captured as the LFOR is rotated, thus generating an ICDA cube (ICDAC) of information. The data capture rate and the LFOR rotation rate may be synchronized such that sufficient information is captured to satisfy Nyquist's Theorem for both spatial and temporal sampling.

A specified area that may include, but not be limited to, a single pixel in the ICDA may be analyzed through the ICDAC which amounts to tracing the information in this pre-defined area as a function of time and thus light intensity modulation. A null condition generally exists in an area about the central axis and can be removed by translating the LFOR, generating multiple LFOR's offset from one another, translating the sample, or other approaches. For a flat surface, the spatial frequencies will typically all be the same and therefore may be used, though not required to be used, as a reference signal for each trace through the ICDAC.

A non-flat surface may contain multiple spatial frequencies, and thus will distort the structured light along the curvature of the surface. The amount of distortion is generally related to the displacement perpendicular to the incoming light. As the LFOR is rotated, the distortion manifests itself as a phase lag or lead in the ICDAC trace as compared to the reference flat surface. The relative phase compared to the reference for each trace in the ICDAC can be extracted through several methods including, but not limited to, time differencing, Lissajous analysis, product methods, Fourier analysis, phase locking methods, etc.

Given the modulated nature of the apparatuses, low level signals can be differentiated from back ground noise by using several different techniques, including time and frequency-based filtering, lock-in detections schemes, or other. Additionally, the wavelength of the light and the type of sensor can be adjusted to maximize not only the amount of reflected light but also the detector sensitivity to that wavelength of light, for example.

FIG. 1 illustrates a first example of a measuring system 100 in accordance with certain implementations of the disclosed technology. In the example, the system 100 includes a light source 120 capable of generating rotating, structured light that is projected onto a sample area 110. The structured light, as projected onto the sample area 110, may be measured by a first sensor 160. A second sensor may be used to measure the angular position of the structured light. The data from the first sensor 160 and the second sensor may be collected and passed to a computing system 190. The computing system 190 will have the ability to synchronize the angular position as measured by the second sensor with the data acquired by the first sensor 160. The computing system 190 may also be configured to store and analyze data.

Figure 2:
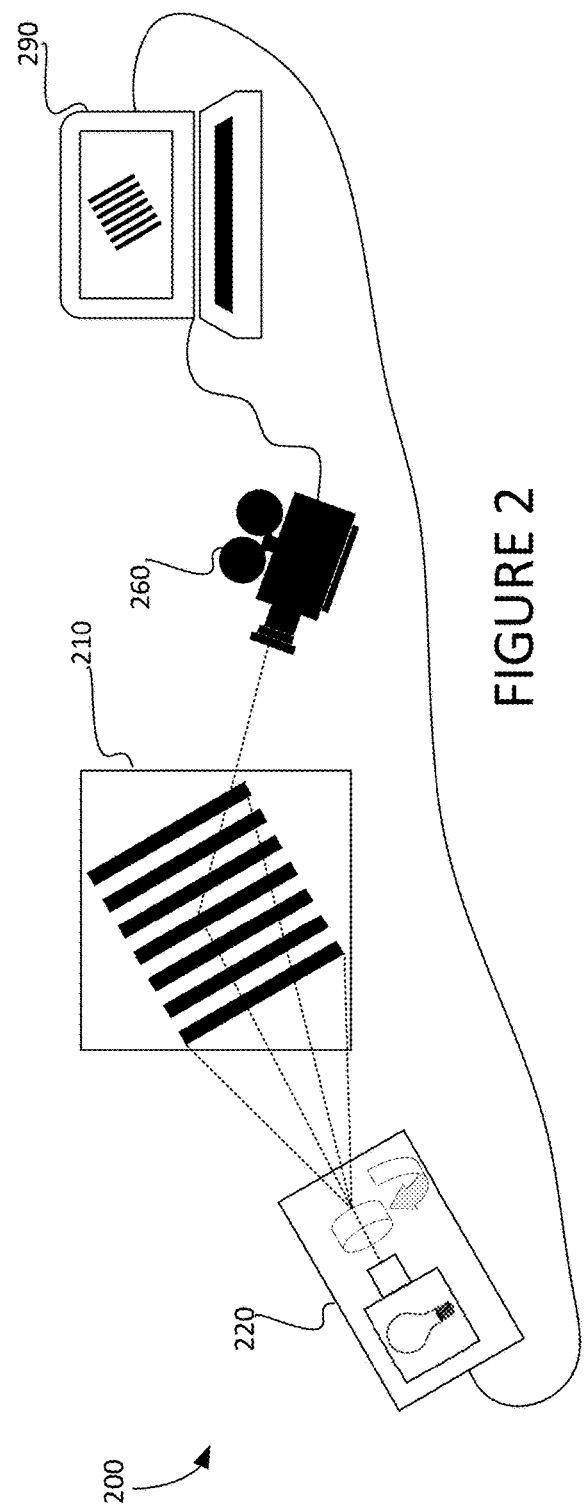
FIG. 2 illustrates a second example of a measuring system in accordance with certain implementations of the disclosed technology.

FIG. 2 illustrates a second example of a measuring system 200 in accordance with certain implementations of the disclosed technology. Similar to the system 100 of FIG. 1, the system 200 includes a sample area 210, a light source 220, a first sensor 260, and a computing system 290. However, with regard to system 200, the projected structured light has been shown to be rotated to an arbitrary angle with its subsequent data representation shown on the computing system 290. It will be appreciated that the structured light can be rotated to arbitrary, discrete angles or rotated continuously. Regardless, data from the first sensor 260 and the second sensor may be synchronized.

Figure 3:
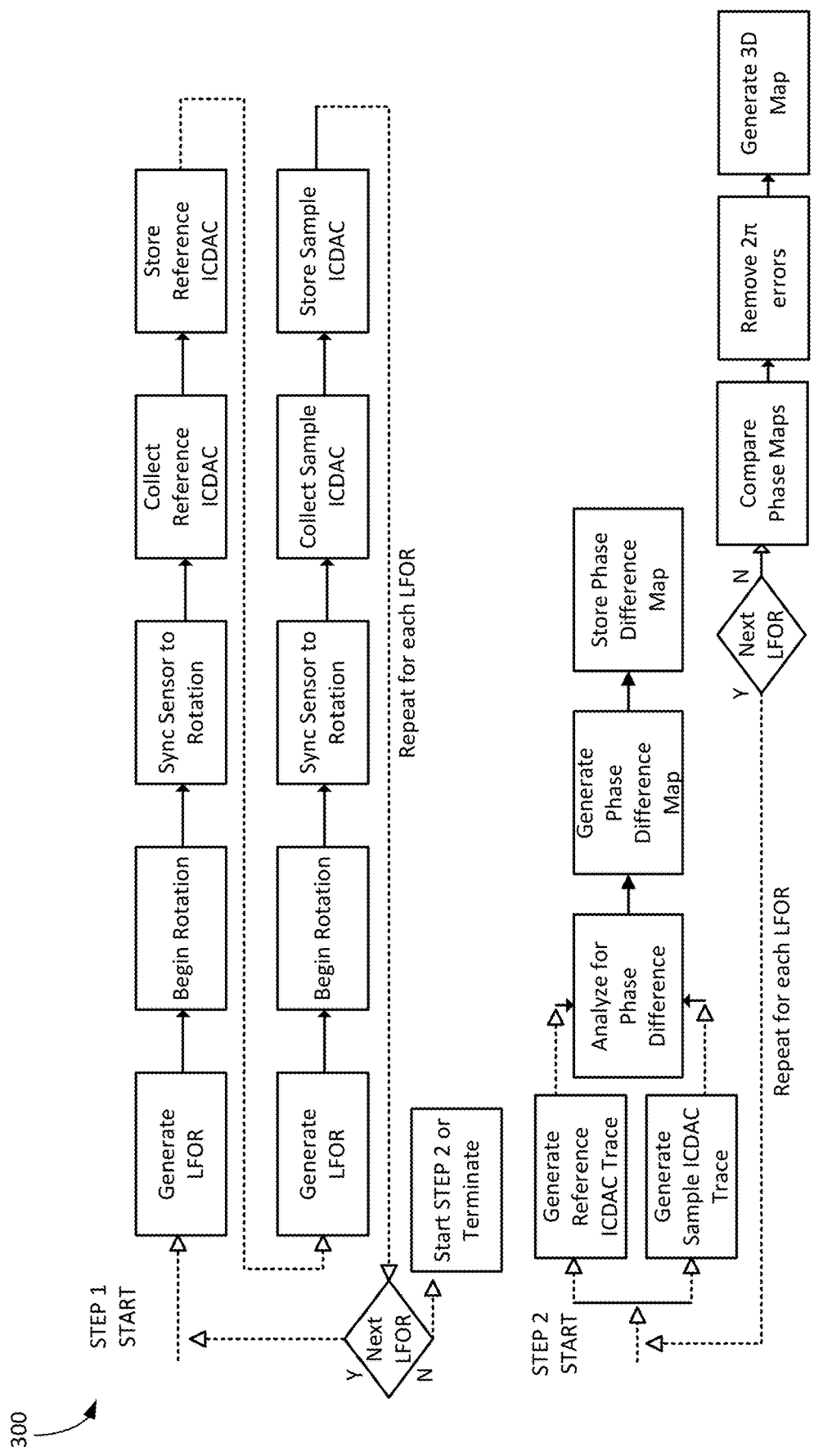
FIG. 3 illustrates a first example of a method for generating and analyzing data in accordance with certain implementations of the disclosed technology.

FIG. 3 illustrates a first example of a method 300 for generating and analyzing data in accordance with certain implementations of the disclosed technology. In Step 1, the structured light (Light Frame of Reference, LFOR) is generated at certain angles, rotated, and synchronized with the sensor. Data is collected (Image Capture Data Array Cube, ICDAC) for both the reference and the sample for each LFOR and stored for processing in Step 2. This process can be repeated for multiple LFOR or terminated after a single comparison.

In Step 2, ICDAC Traces (at each X,Y location in the sensor) may be extracted from the stored IDAC for both reference and sample and analyzed to extract the relative phase. The relative phase may be stored for each ICDAC trace to generate a phase map for each LFOR. Multiple Phase Maps may be compared to identify any phase wrapping errors, and identified errors may be corrected. Phase may be converted to 3D height map information based upon the LFOR reference calibration.

Steps 1 and 2 may be done sequentially or in parallel.

Figure 4:
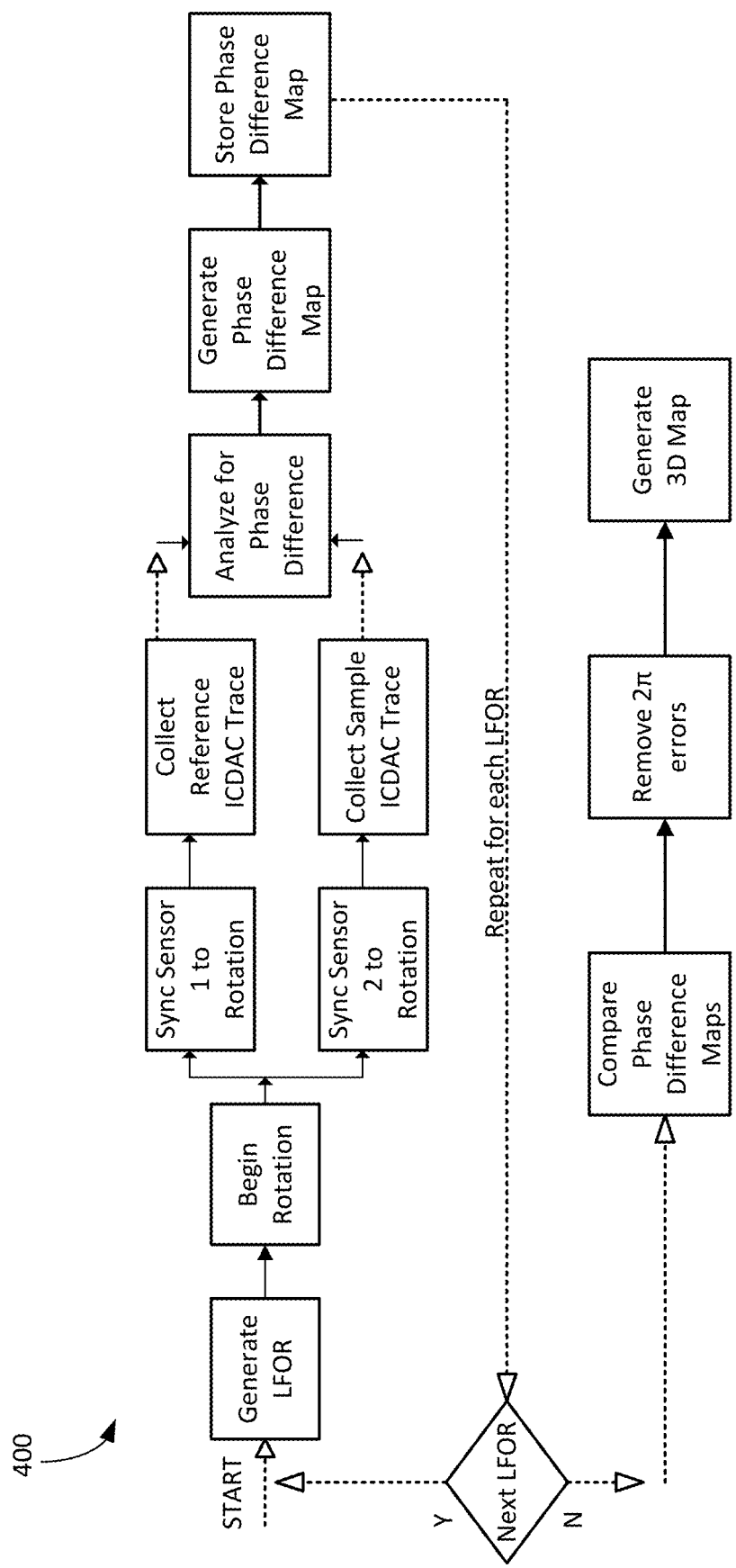
FIG. 4 illustrates a second example of a method for generating and analyzing data in accordance with certain implementations of the disclosed technology.

FIG. 4 illustrates a second example of a method 400 for generating and analyzing data in accordance with certain implementations of the disclosed technology. In this alternative approach, the reference and sample data may be collected and analyzed simultaneously. IDAC Trace analysis for relative phase may be done through software or through hardware.

Figure 5:
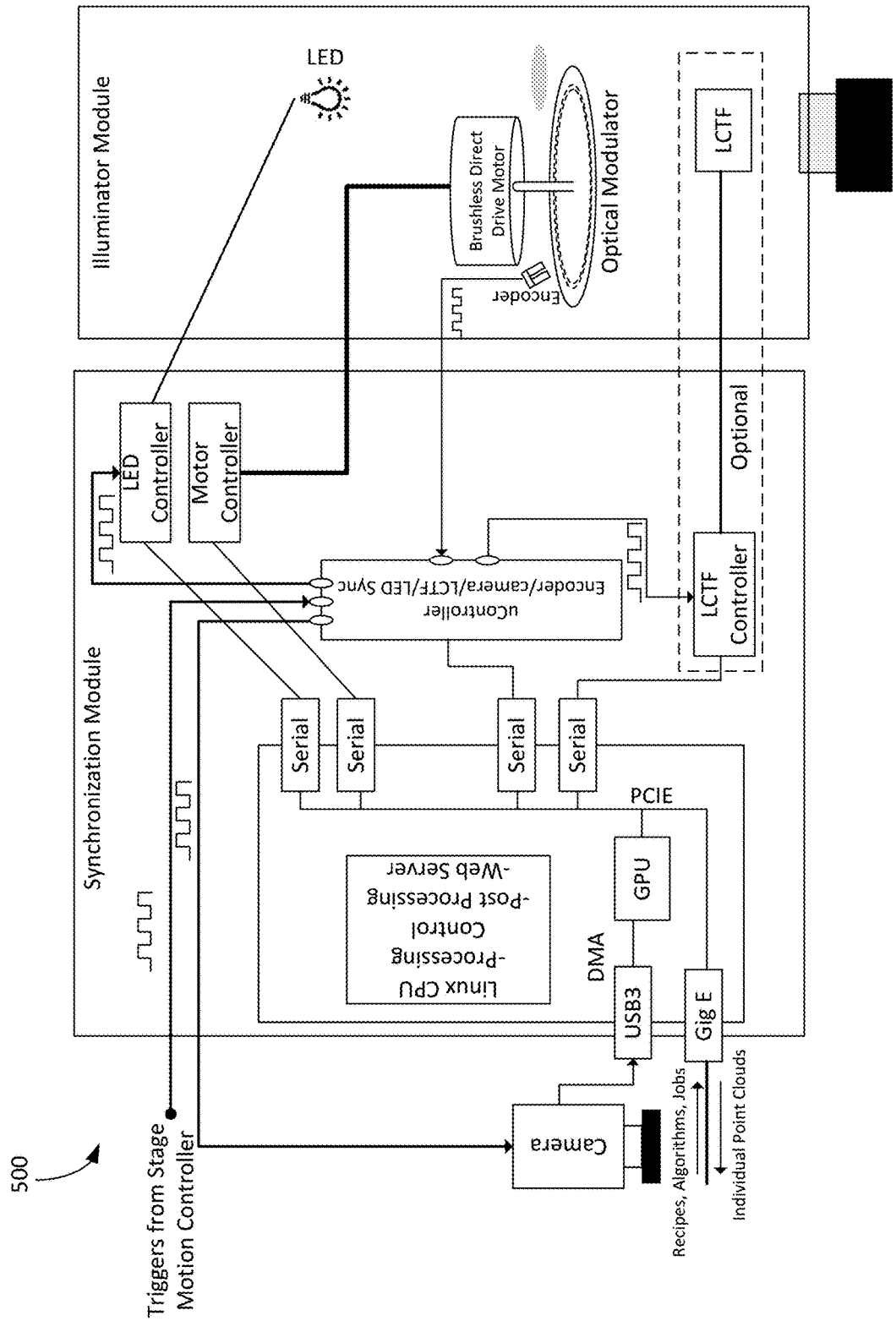
FIG. 5 is a functional diagram 500 illustrating an example of a measuring system in accordance with certain implementations of the disclosed technology.

FIG. 5 is a functional diagram 500 illustrating an example of a measuring system in accordance with certain implementations of the disclosed technology. The example includes a synchronization module and an illuminator module.

Certain implementations of the disclosed technology generally include a large, diffusely scattering surface, e.g., to remove any hot spots or optical non-uniformity from the light source. The size of this surface is typically directly proportional to the size and curvature of the sample, thus allowing all angles of the sample surface to be illuminated simultaneously, e.g., without any hot spots. The sample and the observing sensor may be geometrically configured such that the sensor may image the diffusely scattered, spatially modulated light form the sample surface. This spatially modulated light can be transformed into phase and subsequently surface height.

A spatially modulated light source may be used, as well as a diffusely reflecting screen (e.g., having a flat or curved surface). The screen may be illuminated off axis. A sample may be staged with automation to manipulate the sample (e.g., by rotation). A sensor (e.g., an area scan camera) may have optics to image the surface of the sample object. The camera and optics may be set up in such a way to observe the diffusely reflected light form the sample surface. Data may be collected in a first sample orientation, the sample may be rotated (e.g., at least 90 degrees), and data may be collected again. The surface may be reconstructed from the phase measurements using known phase unwrapping algorithms, for example.

Figure 6:
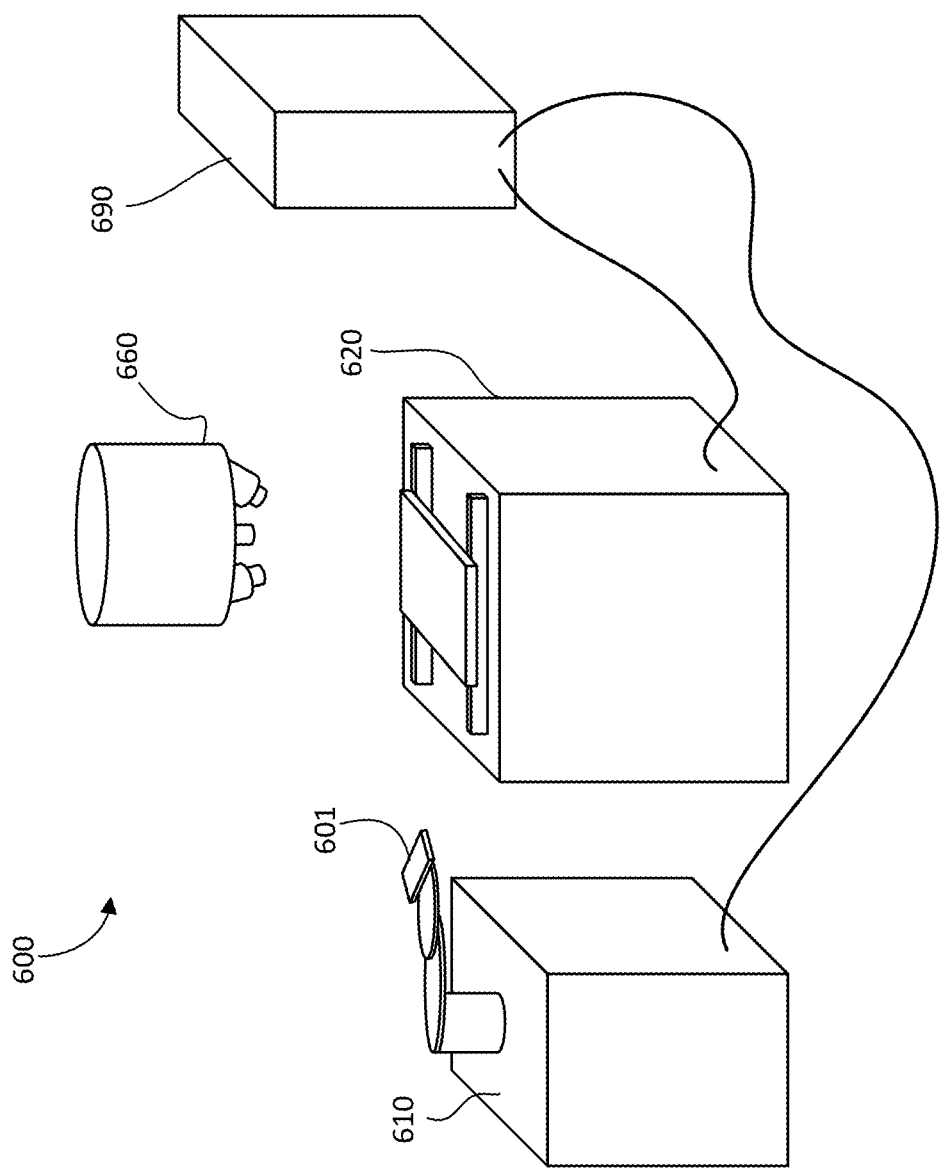
FIG. 6 illustrates a third example of a measuring system in accordance with certain implementations of the disclosed technology.

FIG. 6 illustrates a third example 600 of a measuring system in accordance with certain implementations of the disclosed technology. The system 600 includes a sample positioning apparatus 610 configured to position a sample 601. The sample positioning apparatus 610 may be a robot or other automated apparatus having one or more axis for picking, placing, and/or aligning the sample 601, for example. The system 600 also includes a staging apparatus 620 that may have one or more axis for positioning the sample 610 before and/or during the measurement. The system 600 also includes a measurement apparatus 660 for measuring dimensions, topography, and characteristics of the sample 601, for example. The system 600 also has a computing system 690 that may be configured to synchronize motion, measurement, and/or analysis, for example.

Figure 7:
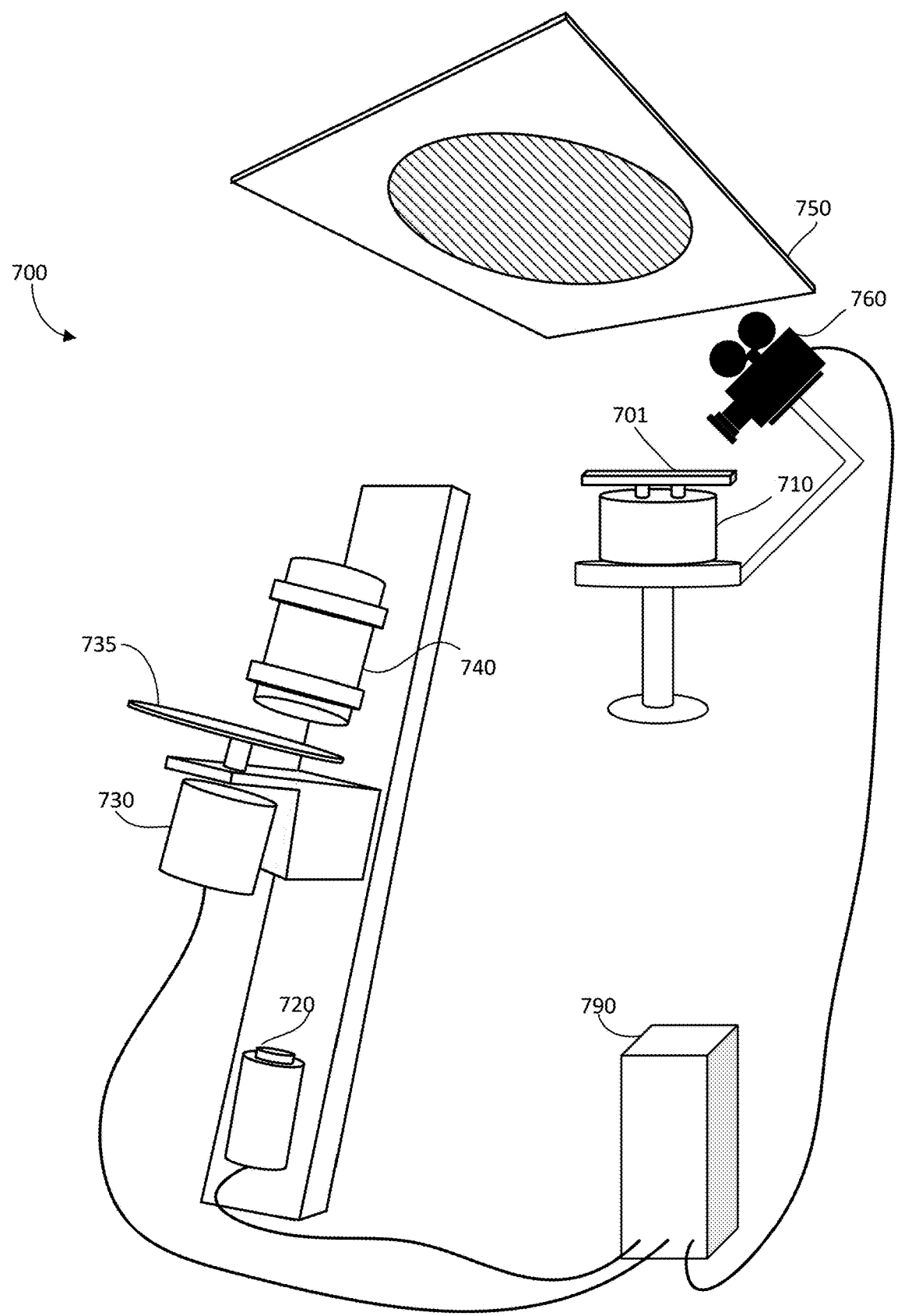
FIG. 7 illustrates a fourth example of a measuring system in accordance with certain implementations of the disclosed technology.

FIG. 7 illustrates a fourth example 700 of a measuring system in accordance with certain implementations of the disclosed technology. The system 700 includes a sample positioning apparatus 710, at least one light source 720, a motor 730, an optical modulator 735, a lens element 740, a first sensor 760, and a computing system 790. The system 700 also includes a projection surface 750 configured to receive projected light. The sample positioning apparatus 710 is generally configured to position a sample 701.

In the example 700, the motor 730 is configured to rotate an axis and the optical modulator 735 is coupled with the axis and configured to be rotated by the axis. The motor may be a brushless direct drive motor, a stepper motor, or a brush DC motor, for example, or any other suitable type of motor. In certain embodiments, the motor 730 may be configured to continuously rotate the axis such that the optical modulator 735 is continuously rotated by the axis.

The light source 720 is configured to shine light through the optical modulator 735 to project structured light onto the projection surface 750 through the lens element 740. The light source 720 may have projection optics that are capable of generating and rotating structured light, for example. In certain embodiments, the light source 720 may be selected from a group consisting of the following: a light emitting diode (LED), a laser, and a filament source.

In certain embodiments, the system has multiple light sources, including the light source 720, that are configured to eliminate any null conditions. These multiple light sources may be configured to shine light at different widths, spatial frequencies, and angle of incidence to extend dynamic range or eliminate phase errors.

In certain embodiments, the optical modulator 735 includes an encoder that is configured to cause a pattern to be created by the structured light that is shined by the light source 720 onto the projected surface 750. The projection surface 750 may be made of a material, e.g., a rough material, that is selected from a group consisting of the following: paper, metal, cardboard, cloth, fabric, and paint. The surface of the sample 701 may be shiny, e.g., the sample 701 may be made of glass.

In the example 700, an optical sensor apparatus includes at least the first sensor 760 and is configured to capture an image of the sample 701 by diffused light that is reflected from the projection surface 750 and subsequently reflected from the sample 701. The optical sensor apparatus may include an array of more than one sensor selected from a group consisting of the following: a CMOS sensor, a photodetector, a photomultiplier tube (PMT), and a charged coupled device (CCD). The surface of the sample 701 may act to distort or deflect the structured light, and the sensor 760 may read this distorted light, for example.

The computing system 790 includes a synchronization module that is configured to phase lock the system by coordinating at least one light source 720 and the first sensor 760 and any other associated sensors. The computing system 790 further includes an analysis module that is configured to compute a three-dimensional (3D) object based on the received diffuse light that is reflected from the projection surface 750 and the sample 701. The features of the 3D object may be related to the amount of light distorted by the sample 701, for example.

In certain embodiments, the first sensor 760 may be coupled with the sample positioning apparatus 710, e.g., by way of a table. In alternative implementations, the first sensor 760 may be physically separate from the sample positioning apparatus 710.

In certain alternative implementations, the structured light that is projected onto the projection surface 750 may be projected from behind the projection surface 750 rather than from the front of the projection surface 750.

Figure 8:
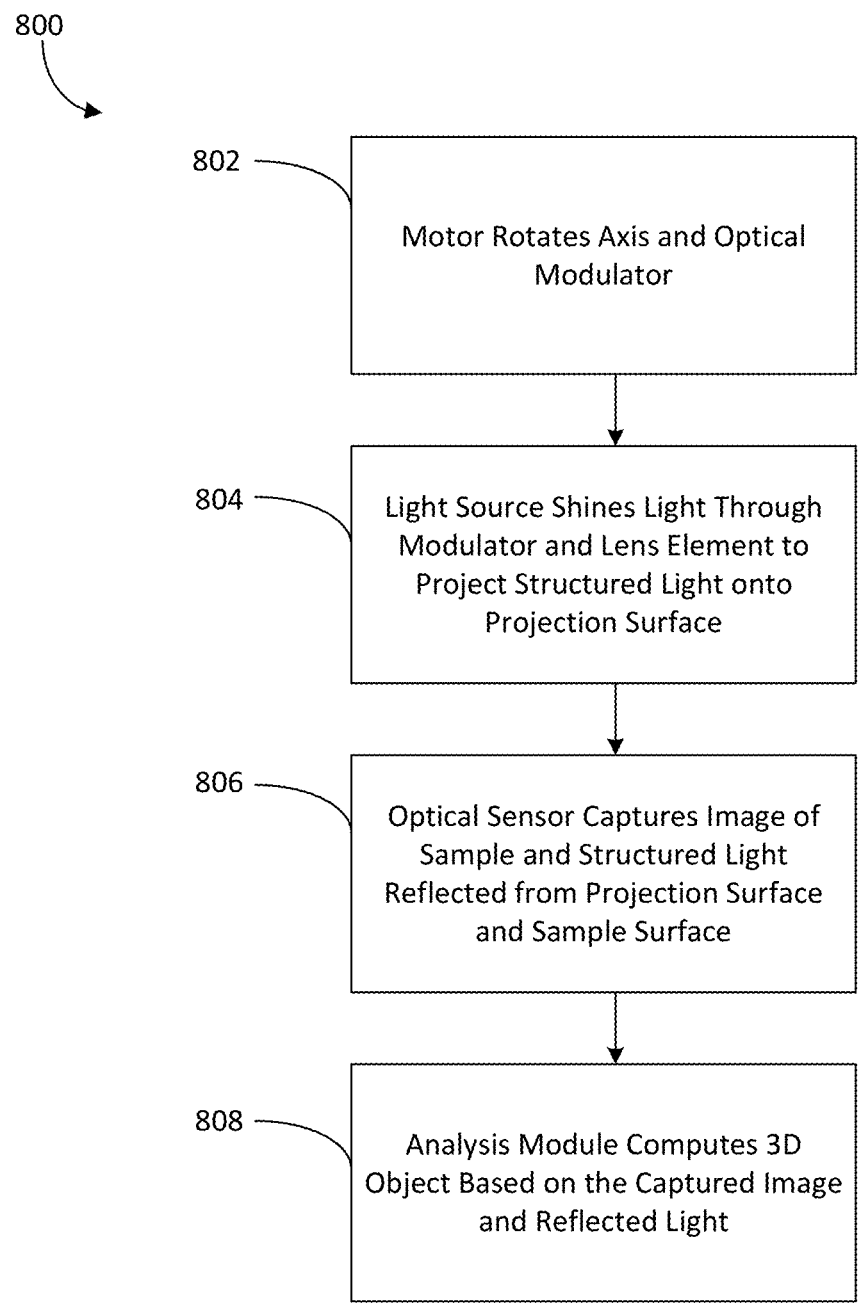
FIG. 8 illustrates an example of a method in accordance with certain implementations of the disclosed technology.

FIG. 8 illustrates an example of a computer-implement method 800 in accordance with certain implementations of the disclosed technology. At 802, a motor rotates an axis, causing an optical modulator that is coupled with the axis to rotate. In certain embodiments, the motor continuously rotates the axis such that the optical modulator that is coupled with the axis is continually rotated by the axis.

At 804, a light source shines light through the optical modulator to project structured light onto a projection surface through a lens element. The light source may include at least one selected from a group consisting of the following: a light emitting diode (LED), a laser, and a filament source. In certain embodiments, multiple light sources may shine light at a number of different widths, spatial frequencies, and angle of incidence to extend dynamic range or eliminate phase errors.

At 806, an optical sensor apparatus having at least one sensor captures an image of the sample and structured light that is reflected from the projection surface and the sample surface, which may be shiny. The projection surface may be made of a material that is selected from a group consisting of the following: paper, metal, cardboard, cloth, fabric, and paint, or any other suitable material.

In certain embodiments, the at least one sensor may be selected from a group consisting of the following: a CMOS sensor, a photodetector, a photomultiplier tube (PMT), and a charged coupled device (CCD).

At 808, an analysis module computes a three-dimensional (3D) object based at least in part on the structured light that is reflected from the projection surface and the sample surface.

While not illustrated by FIG. 8, it will be appreciated that the method 800 further includes a synchronization module phase locking the system by coordinating the light source and the at least one sensor.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this disclosure to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "right" and "left" are used for convenience and in reference to the diagrams provided in figures. But the disclosed subject matter may have a number of orientations in actual use or in different implementations. Thus, a feature that is vertical, horizontal, to the right, or to the left in the figures may not have that same orientation or direction in all implementations.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Although specific embodiments of the invention have been illustrated and described for purposes of illustration, it will be understood that various modifications may be made without departing from the spirit and scope of the invention. Accordingly, the invention should not be limited except as by the appended claims.

The invention claimed is:

1. A system, comprising:
   an axis;
   a motor coupled with the axis and configured to rotate the axis;
   an optical modulator coupled with the axis and configured to be rotated by the axis;
   a lens element;
   a projection surface;
   a light source configured to shine light through the optical modulator to project structured light onto the projection surface through the lens element;
   a sensor configured to capture an image of a sample and structured light that is reflected from the projection surface and the sample surface; and
   a computing system including:
     a synchronization module configured to phase lock the system by coordinating the light source and the sensor; and
     an analysis module configured to compute a three-dimensional (3D) object based at least in part on the structured light that is reflected from the projection surface and the sample surface.

2. The system of claim 1, wherein the motor is configured to continuously rotate the axis such that the optical modulator is continuously rotated by the axis.

3. The system of claim 1, wherein the sensor includes at least one selected from a group consisting of the following: a CMOS sensor, a photodetector, a photomultiplier tube (PMT), and a charged coupled device (CCD).

4. The system of claim 1, wherein the light source includes multiple light sources configured to eliminate any null conditions.

5. The system of claim 4, wherein the multiple light sources are configured to shine light at different widths, spatial frequencies, and angle of incidence to extend dynamic range or eliminate phase errors.

6. The system of claim 1, wherein the light source includes at least one selected from a group consisting of the following: a light emitting diode (LED), a laser, and a filament source.

7. The system of claim 1, wherein the motor is a brushless direct drive motor, a stepper motor, or a brush DC motor.

8. The system of claim 1, wherein the projection surface is made of a material that is selected from a group consisting of the following: paper, metal, cardboard, cloth, fabric, and paint.

9. The system of claim 8, wherein the material is rough.

10. The system of claim 1, wherein the sample surface is shiny.

11. The system of claim 10, wherein the sample is made of glass.

12. The system of claim 1, wherein the optical modulator includes an encoder configured to cause a pattern to be created by the structured light that is shined by at least one light source onto the projected surface.

13. A method, comprising:
   a motor rotating an axis, causing an optical modulator coupled with the axis to rotate;
   a light source shining light through the optical modulator to project structured light onto a projection surface through a lens element;
   an optical sensor apparatus having at least one sensor capturing an image of the sample and structured light that is reflected from the projection surface and the sample surface;
   a synchronization module phase locking the system by coordinating the light source and the at least one sensor; and
   an analysis module computing a three-dimensional (3D) object based at least in part on the structured light that is reflected from the projection surface and the sample surface.

14. The method of claim 13, further comprising the motor continuously rotating the axis such that the optical modulator is continually rotated by the axis.

15. The method of claim 13, further comprising multiple light sources shining light at different widths, spatial frequencies, and angle of incidence to extend dynamic range or eliminate phase errors.

16. The method of claim 13, wherein the at least one sensor is selected from a group consisting of the following: a CMOS sensor, a photodetector, a photomultiplier tube (PMT), and a charged coupled device (CCD).

17. The method of claim 13, wherein the light source includes at least one selected from a group consisting of the following: a light emitting diode (LED), a laser, and a filament source.

18. The method of claim 13, wherein the sample surface is shiny.

19. The method of claim 13, wherein the projection surface is made of a material that is selected from a group consisting of the following: paper, metal, cardboard, cloth, fabric, and paint.

20. One or more fixed, tangible computer-readable media containing instructions that, when executed by a processor, cause the processor to perform a computer-implemented method comprising:
- a motor rotating an axis, causing an optical modulator coupled with the axis to rotate;
- a light source shining light through the optical modulator to project structured light onto a projection surface through a lens element;
- an optical sensor apparatus having at least one sensor capturing an image of the sample and also the structured light that is reflected from the projection surface and subsequently the sample surface;
- a synchronization module phase locking the system by coordinating the light source and the at least one sensor; and
- an analysis module computing a three-dimensional (3D) object based at least in part on the structured light that is reflected from the projection surface and the sample surface.

* * * * *